United States Patent [19]

Aso

[11] Patent Number: 4,918,323
[45] Date of Patent: Apr. 17, 1990

[54] ENGINE STARTING AND CHARGING DEVICE

[75] Inventor: Hiroaki Aso, Hyogo, Japan

[73] Assignee: Mitsubishi Denki Kabushiki Kaisha, Tokyo, Japan

[21] Appl. No.: 265,864

[22] PCT Filed: Feb. 9, 1988

[86] PCT No.: PCT/JP88/00130
§ 371 Date: Oct. 6, 1988
§ 102(e) Date: Oct. 6, 1988

[87] PCT Pub. No.: WO88/06372
PCT Pub. Date: Aug. 25, 1988

[30] Foreign Application Priority Data

Feb. 12, 1987 [JP] Japan .................... 62-30025

[51] Int. Cl.⁴ .................... F02N 11/00; F16D 3/12
[52] U.S. Cl. ........................... 290/46; 74/7 C
[58] Field of Search ............... 290/46, 48; 74/6, 7 R, 74/7 C; 123/179 K

[56] References Cited

U.S. PATENT DOCUMENTS 4,010,377  3/1977  McKenzie ............... 290/46 X
4,317,435  3/1982  Kohlhage ............... 74/7 C X
4,624,351  11/1986 Lutz et al. ............. 74/7 C X

FOREIGN PATENT DOCUMENTS 54949    11/1986 Japan .
63-309768 12/1988 Japan ..................... 290/46

Primary Examiner—Derek S. Jennings
Assistant Examiner—W. E. Duncanson, Jr.
Attorney, Agent, or Firm—Sughrue, Mion, Zinn, Macpeak and Seas

[57] ABSTRACT

A field core and an armature core are directly mounted on a cylinder block, and a clutch plate frictionally connected with a clutch disc is mounted through a cushioning material to a revolving-field poles mounted on the engine crankshaft, so that a space will be provided between the clutch plate at this frictionally connected area and the revolving-field poles, thereby insulating by the space the frictional heat at the clutch plate connection area caused by clutch connection and disconnection, thus restraining temperature rise of the revolving-field poles, and preventing deformation and damage of the revolving-field poles. The cushioning material has an effect to absorb various types of vibrations occurring with connection and disconnection between the clutch plate and the clutch disc. Furthermore, besides the above-mentioned advantages, the present invention can effectively restrain temperature rise of the revolving-field poles by dissipating the heat generated at the field winding and armature winding to the cylinder block through the field core and armature core.

7 Claims, 2 Drawing Sheets

ENGINE STARTING AND CHARGING DEVICE

FIELD OF THE INVENTION

The present invention relates to an engine starting and charging device that a starting motor for starting an engine and a charging generator driven by the engine to charge a battery are formed as one unit.

BACKGROUND OF THE INVENTION

An engine starting and charging device comprising a starting motor and a charging generator as one unit has been suggested as a prior art, for example, one disclosed in Laid-Open Japanese Pat. No. Sho No. 61-54949.

FIG. 1 is a sectional view of a prior-art engine starting and charging device disclosed in Laid-Open Japanese Pat. No. Sho No. 61-54949. In FIG. 1, a starting and charging device body 1 comprises revolving-field poles 2a, 2b, a field coil 3, an armature core 4, an armature coil 5, and a crank angle detector 6 as major components.

The revolving field poles 2a, 2b are a pair of comb-shaped field poles produced of a ferromagnetic material, which are coupled as a unit through a ring 7 of non-magnetic material such that those magnetic pole sections are disposed alternately in the circumferential direction.

The revolving-field pole 2a functions also as a flywheel, is fitted on an engine crankshaft 8, and then securely installed by a bolt 9 on the shaft end of this crankshaft 8.

In the side portion of the revolving-field pole 2a is formed a cutout 10 which, combined with the crank angle detector 6, is used to detect the crank angle. The same number of cutouts as the number of the revolving-field poles 2a are provided at equal intervals on the circumference.

The width of the cutout 10 in the circumferential direction makes an angle equal to about one half of 360 degrees divided by the number of the cutouts.

The revolving-field poles 2a, 2b described above are so designed as to be excited by the field winding 3. This field winding 3 is mounted on the field core 11.

This field core 11 is secured by bolts not illustrated, to a rear plate 12, facing the revolving-field pole 2a across a slight gap a provided in the axial direction, and the revolving-field pole 2b across a slight gap b.

The field winding 3 is provided on the fixed side, dispensing with a collector ring; however, because the current flowing into the field winding 3 is much less than the current of the armature winding 5, the current can be applied also through a collector ring and brushes.

The armature core 4 is formed by laminating silicon steel sheets, within the inner periphery of which are provided a large number of slots for setting the armature coil 5 therein. The armature coil 5 is of a three-phase distributed winding type as a common commutatorless motor.

The armature core 4 is fitted to a mounting frame 13, positioned and locked from turning by a key not illustrated, to this mounting frame 13. At this time, the armature core 4 is fixed by a spacer 14 in the axial direction relative to the mounting frame 13 through a spring ring 15.

Furthermore, the mounting frame 13 is mounted by a bolt 16 to the rear plate 12. The rear plate 12 is mounted to the engine body which is not illustrated.

In the meantime, the aforementioned crank angle detector 6 serves as a signal source to energize an armature current switching circuit; here are used signal-generating type proximity switches.

The proximity switches are mounted on the rear plate 12 such that their detecting elements will face each other on the circumferential line where the cutouts 10 of the revolving-field pole 2a are provided, and output a binary signal "1" or "0" corresponding to the crank angle (field pole position) as signal generating conditions vary with a change in inductance at the cutout and non-cutout sections of the revolving-field pole 2a. When a three-phase armature winding 5 is employed, there are used three crank angle detectors 6.

A clutch 17 functions to interruptedly transmit the power from the crankshaft 8 to the transmission drive shaft 18. This clutch 17 is a diaphragm spring clutch comprising a clutch disc 19, a pressure plate 20, a diaphragm spring (disc spring) 21, wire-rings 22, 23, and a clutch cover 24.

The clutch cover 24 is mounted by bolts 25 to the revolving-field pole 2a which serves also as a flywheel. Numerals 26a, 26b are clutch discs.

Next, operation at the time of starting will be explained. When a key switch (not illustrated) is turned to the START position with the engine left stationary, the current will flow from a battery (not illustrated) into the field winding 3 and the armature winding 5, thereby producing a torque at the revolving-field poles 2a, 2b to turn the crankshaft 8 which is directly coupled therewith.

When the revolving-field poles start turning, the crank angle detector 6 will detect the positions of these revolving-field poles, thus operating the armature current switching circuit (not illustrated) such that the speed of the revolving field which is formed by the armature winding 5 will become the same as the speed of rotation of the revolving-field poles; and accordingly the revolving-field poles 2a, 2b, gaining a torque, will further accelerate.

Since a great starting torque is obtainable on account of such a positive feedback action, the engine will be started in a short period of time by the direct-coupled drive.

Subsequently, after the engine has started, when the key switch is placed in the IGNITION position, the starting and charging device body 1 operates as an a.c. generator; the power generated thereby is converted into a d.c. power by a diode (not illustrated), being supplied to the battery and electrical equipment on the motor vehicle.

The operation of the clutch 17 is as follows. When the clutch pedal (not illustrated) is not depressed, the tension of the diaphragm spring 21, as well known, is applied by leverage to the clutch disc 19 mounted on the transmission drive shaft 18 through a pressure plate 20. This clutch disc 19, therefore, is pressed against the side of the revolving-field pole 2a, thus connecting the clutch 17.

When the clutch pedal is depressed, a sleeve which is not illustrated will slide in the axial direction, pressing the central part of the diaphragm spring 21 in the direction of the arrow C. This diaphragm spring 21 will deflect back on the wire rings 22, 23 as a fulcrum, thereby removing the pressure applied to the clutch disc 19 and accordingly disconnecting the clutch 17. Thus the transmission of power from the crankshaft 8 to the transmission drive shaft 18 will be interrupted.

As described above, the starting and charging device body 1 is formed integral with the clutch 17 by directly coupling the revolving-field pole 2a of the starting and charging device body 1 with the engine crankshaft and further by using this revolving-field pole 2a as a carrier of the clutch 17 for connection and disconnection between the crankshaft 8 and the transmission drive shaft 18.

In the prior-art engine starting and charging device described above, the whole body of the device is hermetically enclosed and therefore the atmospheric temperature of the hermetically enclosed chamber will become very high on account of a great deal of frictional heat occurring at the time of connection and disconnection of the clutch disc 19 of the clutch 17, and a resistance loss heat resulting from the flow of tremendous current into the armature winding 5 or the current flowing into the field winding 3.

However, there is a problem that, since there is provided no cooling means such as a cooling fan, and if a cooling means is provided, a cooling effect will be low in the hermetically enclosed chamber, resulting in excessively high temperature rise at each part, deteriorated quality in respect of heat resistance, decreased current in the field winding 3 in respect of performance, and accordingly in a failure in obtaining a desired starting torque or output current.

In the meantime, the clutch plate requires to be produced of a material having a great frictional coefficient and high wear resistance, but, on the contrary, the revolving-field poles 2a, 2b which constitute the magnetic poles require to be made of a low wear-resistant material such as S10C of high permeability.

Therefore, still another problem, beside the aforesaid problems, is that the temperature of the revolving-field pole 2a rises in excess because of the frictional connection of the clutch plate, with the result that the revolving-field poles will be subjected to deformation and damage.

Furthermore, still another problem is that since the clutch 17 is directly mounted to the revolving-field pole 2a, vibration caused by clutch connection and disconnection passes to this revolving-field pole 2a.

SUMMARY OF THE INVENTION

The present invention has been accomplished in an attempt to solve the aforementioned problems, and has an object to provide an engine starting and charging device which is capable of restraining the temperature rise of the revolving-field poles, preventing deformation and damage, and absorbing various types of vibrations.

Another object of this invention is to provide an engine starting and charging device which is able to dissipate the heat of the field winding and the armature winding to the cylinder block in order to effectively restrain the temperature rise of the revolving-field poles.

According to the engine starting and charging device of the present invention, the clutch plate frictionally connected with the clutch disc is connected to a part of the revolving-field poles through a cushioning material such that a space will be formed; therefore, the heat at the aforementioned frictionally connected part will be intercepted by the space and accordingly will not pass to the revolving-field poles, and, in addition, vibration occurring with the connection and disconnection between the clutch disc and the clutch plate will be absorbed by a cushioning material to prevent its transmission to the revolving-field poles.

In the present invention, the field core and the armature core are directly mounted on the cylinder block, so that heat generated at the field winding and the armature winding will be dissipated to the cylinder block through the field core and the armature core, thereby effectively restraining temperature rise at the revolving-field poles in addition to the above-mentioned advantages.

BEST MODE OF THE PRESENT INVENTION

Figure 1:
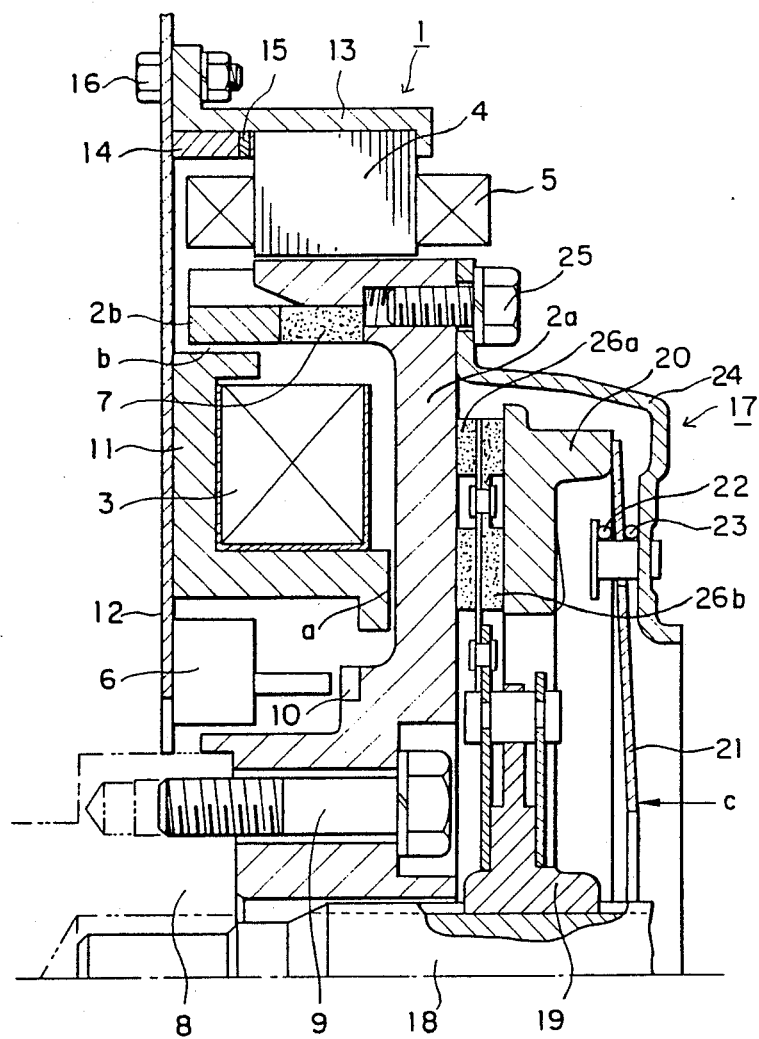
FIG. 1 is a sectional view of a prior-art starting and charging device.
Figure 2:
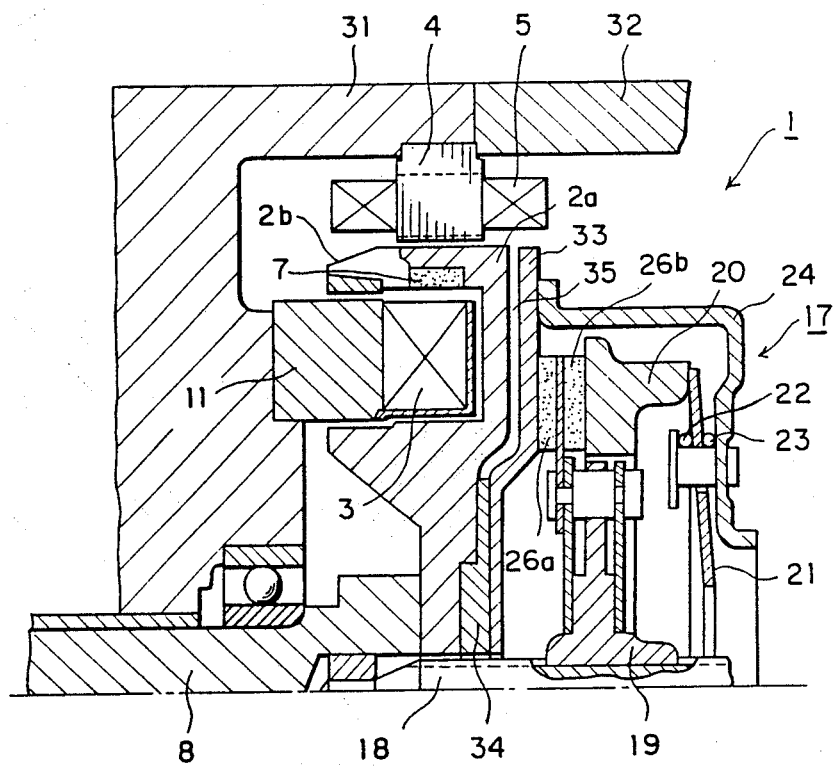
FIG. 2 is a sectional view showing an engine starting and charging device in accordance with one embodiment of the present invention.

A preferred embodiment of the present invention will now be described by referring to the accompanying drawings. FIG. 2 is a sectional view showing the constitution of the preferred embodiment. In FIG. 2, the same numerals are used for parts corresponding to those used in FIG. 1 for the purpose of preventing reduplication of explanation, and description will be made mainly of parts different from those in FIG. 1.

In FIG. 2, parts described below are different from those appearing in FIG. 1. These parts make features of the present invention. Namely, in FIG. 2, the field core 11 and the armature core 4 are directly mounted on the cylinder block 31.

This cylinder block 31 has an engine coolant circulation system in connection with a radiator though not illustrated, so that the engine will be cooled with the coolant circulating in this engine coolant circulation system from the radiator.

The heat generated at the armature winding 5 is dissipated to the cylinder block 31 through the armature core 4, while the heat generated at the field winding 3 is dissipated to the cylinder block 31 through the field core 11.

To this cylinder block 31 is attached a transmission case 32, which also dissipates the heat of the armature winding 5 through the armature core 4 and the cylinder block 31.

In the meantime, numeral 33 is a clutch plate, which is made of high wear-resistant asbestos, gray cast iron and so forth. This clutch plate 33 is mounted to the revolving-field pole 2a through a high heat-resistance cushioning material 34 such as hard rubber. This cushioning material 34 is disposed at the central part of the revolving-field pole 2a, but not in the part where the clutch plate 33 faces the field winding 3. This facing area has a space 35 communicating to the outside air. The clutch plate 33 in the area corresponding to this space 35 is frictionally connected with the clutch disc 26a.

In short, this area of frictional connection faces the revolving-field pole 2a across the space 35.

To the clutch plate 33 is attached the clutch cover 24. Other constitution is similar to that in FIG. 1; however, the constitution shown in FIG. 2 can dispense with the mounting frame 13, the spacer 14, the spring ring 15, and the bolts 16, 25 in FIG. 1, and also the illustration of the crank angle detector 6, the cutout 10, and the bolt 9 is omitted.

Next, the operation of the present invention will be explained. Engine starting, charge, and clutch operation, being the same as described in FIG. 1, are not described here. Restraint of temperature rise and absorption of vibration of the revolving-field pole 2a will be explained.

First, the area frictionally connected between the clutch plate 33 and the clutch disc 26a gets heated with the connection and disconnection of the clutch 17. In this frictionally connected area of the clutch plate 33, the space 35 exists between the clutch plate 33 and the revolving-field pole 2a, thereby preventing the heat from conducting the revolving-field pole 2a.

Therefore, the temperature rise of the revolving-field pole 2a caused by the heat present in the frictional connection area of the clutch disc and the clutch plate can be restrained, thus protecting the revolving-field pole 2a from deformation and damage.

Furthermore, various types of vibrations caused by connection and disconnection between the clutch plate 33 and the clutch disc 26a and by torque variation of engine is absorbed by the cushioning material 34.

What is claimed is:

1. An engine starting and charging device, comprising: a starting and charging device body having revolving-field poles mounted on an engine crankshaft, a field winding wound around a field core, and an armature winding wound around an armature core; and a clutch plate mounted oppositely to said revolving-field poles through a cushioning material such that a space communicating to the outside air will be formed between a portion frictionally connected with a clutch disc and said revolving-field poles.

2. An engine starting and charging device as claimed in claim 1, wherein said clutch plate is formed of a member of high wear resistance.

3. An engine starting and charging device as claimed in claim 1, wherein said cushioning material is made of a material having high heat resistance.

4. An engine starting and charging device, comprising: a starting and charging device body which consists of revolving-field poles mounted on an engine crankshaft, a field winding wound around a field core, and an armature winding wound around an armature core, produces a torque at said revolving-field poles when starting the engine, by supplying the current to energize said field winding and armature winding, thus turning said crankshaft to start the engine, and operates as a generator, after the starting of the engine, to charge a battery; and a clutch plate mounted oppositely to said revolving-field poles through a cushioning material such that a space communicating to the outside air will be formed between a portion frictionally connected with a clutch disc of a clutch and said revolving-field poles.

5. An engine starting and charging device as claimed in claim 4, wherein the field winding and the armature winding are energized and excited by a battery.

6. An engine starting and charging device, comprising: a starting and charging device body which consists of revolving-field poles mounted on an engine crankshaft, a field winding wound around a field core, and an armature winding wound around an armature core, produces a torque at said revolving-field winding, when starting the engine, by supplying the current from a battery to energize and excite said field winding and armature winding, thus turning said crankshaft to start the engine, and operates as a generator, after the starting of the engine, to charge the battery; a cylinder block on which said field core and armature core are directly mounted; and a clutch plate mounted oppositely to said revolving-field poles through a cushioning material such that a space communicating to the outside air will be formed between a portion frictionally connected with a clutch disc of a clutch and said revolving-field poles.

7. An engine starting and charging device as claimed in claim 6, wherein a transmission case is attached to said cylinder block.

* * * * *